United States Patent
Gergov et al.

(10) Patent No.: US 11,351,707 B2
(45) Date of Patent: Jun. 7, 2022

(54) METHOD AND APPARATUS FOR REAL TIME CONTROL OF INJECTION OF STRUCTURAL FOAMING AGENTS, COLORANTS, AND OTHER ADDITIVES

(71) Applicant: IMFLUX INC., Hamilton, OH (US)

(72) Inventors: Milko Gergov, Ann Arbor, MI (US); Gene Michael Altonen, West Chester, OH (US); Herbert Kenneth Hanson, III, Cincinnati, OH (US); William Francis Lawless, III, Medford, MA (US)

(73) Assignee: IMFLUX INC., Hamilton, OH (US)

( * ) Notice: Subject to any disclaimer, the term of this patent is extended or adjusted under 35 U.S.C. 154(b) by 28 days.

(21) Appl. No.: 16/854,598

(22) Filed: Apr. 21, 2020

(65) Prior Publication Data

US 2020/0368951 A1   Nov. 26, 2020

Related U.S. Application Data

(60) Provisional application No. 62/852,106, filed on May 23, 2019.

(51) Int. Cl.
*B29C 44/02* (2006.01)
*B29C 45/18* (2006.01)
*B29C 45/76* (2006.01)

(52) U.S. Cl.
CPC .......... *B29C 45/1816* (2013.01); *B29C 45/76* (2013.01); *B29C 2045/185* (2013.01)

(58) Field of Classification Search
CPC ... B29C 45/164; B29C 45/13; B29C 45/2681; B29C 2045/2683; B29C 2045/27;
(Continued)

(56) References Cited

U.S. PATENT DOCUMENTS 6,284,810 B1   9/2001   Burnham et al.
6,491,860 B1   12/2002   Hendry
(Continued)

FOREIGN PATENT DOCUMENTS

| EP | 3079878 A1 | 10/2016 |
|---|---|---|
| JP | H1134130 A | 2/1999 |
| WO | WO-98/31521 A2 | 7/1998 |

OTHER PUBLICATIONS

International Application No. PCT/US2020/032463, Invitation to Pay Additional Fees, mailed Jul. 24, 2020.
(Continued)

*Primary Examiner* — Joseph S Del Sole
*Assistant Examiner* — Thu Khanh T Nguyen
(74) *Attorney, Agent, or Firm* — Marshall, Gerstein & Borun LLP

(57) ABSTRACT

An additive injection system for use in injection molding machines to inject additive materials, such as fluids or powders, downstream of a nozzle of the injection molding machine. The additive injection unit has an additive tank to store or contain additive material and additive injectors that inject an additive material into an injection molding machine. A pump pumps the additive material from the tank through a common manifold connected to the additive injectors to be injected into the injection molding machine. A controller controls operation of the additive injection device and one or more sensors coupled to the additive injection device can provide feedback to the controller.

17 Claims, 5 Drawing Sheets

(58) Field of Classification Search
CPC .............. B29C 2045/045; B29C 44/12; B29C 44/1219; B29C 44/36; B29C 44/38; B29C 44/381; B29C 44/385
See application file for complete search history.

(56) References Cited

U.S. PATENT DOCUMENTS

| | | |
|---|---|---|
| 2005/0077642 A1 | 4/2005 | Ickinger |
| 2008/0290543 A1* | 11/2008 | Okamoto .............. B29C 44/586 264/55 |
| 2008/0303185 A1* | 12/2008 | Mortazavi ............. B29C 37/005 264/238 |
| 2016/0279846 A1* | 9/2016 | Kong .................. B29C 44/0407 |
| 2017/0001356 A1 | 1/2017 | Hanson, III et al. |
| 2017/0157820 A1* | 6/2017 | Ward .................... B29C 45/164 |
| 2017/0157824 A1* | 6/2017 | Ward .................. B29C 45/0433 |
| 2017/0312954 A1 | 11/2017 | Nobuta et al. |

OTHER PUBLICATIONS

International Application No. PCT/US2020/032463, International Search Report and Written Opinion, dated Sep. 24, 2020.

* cited by examiner

METHOD AND APPARATUS FOR REAL TIME CONTROL OF INJECTION OF STRUCTURAL FOAMING AGENTS, COLORANTS, AND OTHER ADDITIVES

CROSS-REFERENCE TO RELATED APPLICATION

This non-provisional application claims the benefit of the filing date of U.S. Provisional Application No. 62/852,106, filed May 23, 2019, which is hereby incorporated by reference in its entirety.

FIELD OF THE DISCLOSURE

The present disclosure generally relates to injection molding and, more particularly, to injection molding with control of injections of additives.

BACKGROUND

Injection molding is a technology commonly used for high-volume manufacturing of parts constructed from thermoplastic materials. During repetitive injection molding processes, a thermoplastic resin, typically in the form of small pellets or beads, is introduced into an injection molding machine which melts the pellets under heat and pressure. The molten material is then forcefully injected into a mold cavity having a particular desired cavity shape. The injected plastic is held under pressure in the mold cavity and subsequently is cooled and removed as a solidified part having a shape closely resembling the cavity shape of the mold. A single mold may have any number of individual cavities which can be connected to a flow channel by a gate that directs the flow of the molten resin into the cavity.

Additional materials, other than the injected plastic, may be required during an injection molding process to generate specific devices. For example, structural foam materials may be introduced into an injection molding process to produce products that use less material to create, that have increased strength and/or stiffness due to the internal cell structure, and with high strength to weight ratios among other features. Expanding crosslinking polymers (e.g., ethylene-vinyl acetate or "EVA") are one class of polymers that are commonly injection molded as a structural foam. A typical injection molding process of expanding crosslinking polymers generally includes four basic operations: First, the plastic is placed in the hopper and heated in the injection molding machine to allow the plastic to flow under pressure. When injection molding expanding crosslinking polymers, at this step, the polymer is heated to a temperature that is below an activation temperature of the polymer, or the temperature at which expansion and crosslinking within the polymer begins to occur.

Next, the melted plastic is injected into a mold cavity or cavities defined between two mold halves that have been closed. The mold or cavity temperature is set to a value that is high enough to activate a chemical reaction or reactions that cause the polymer to begin expansion and crosslinking. At a third step, the plastic is held under pressure to allow adequate crosslinking and expansion (or blowing) to occur in the cavity or cavities. Last, the mold halves are opened, and the molded article is removed or ejected from the mold, thereby allowing the plastic to expand to a final shape and configuration that is larger than the internal volume of the mold cavity.

In conventional systems, a fixed, predetermined volume of plastic is injected into the mold cavity. This volume only partially fills the cavity. The mold cavity is then heated to cause a chemical reaction, upon which the plastic is then left to expand to fill the mold cavity and crosslink for a specified hold time, which is typically determined via a "gate freeze study" where the part weight is measured over a period of time. In this gate freeze study, part weights are periodically measured during the injection molding process until the weight begins to level off. The point at which the part weight levels off is identified as generally being the optimum time to eject the part. This gate freeze study is typically performed during a process validation stage, and is oftentimes used for the entirety of subsequent injection molding cycles.

After the part is ejected, it is quickly removed from the mold to a stabilization tunnel where curing occurs. By quickly removing the part from the mold, the part can fully expand, and will not be deformed due to the material being constrained from expanding at areas where the part is still captured in the mold. During the curing phase, the part is allowed to slowly cool to a temperature near room temperature. Excess internal gases will slowly escape from the part.

Typically, additional injected materials, other than the injected plastic, are injected along with the injected plastic through a nozzle of an injection molding machine. The nozzle is typically upstream of the mold cavity, causing the additional material to travel with the injected plastic flow front into the mold cavity reducing the control over the final location and concentration of the additional material in the mold cavity. For example, the additional material may migrate to a surface of the mold cavity causing surface defects for parts where the additional material is intended to be in the center of a part surrounded by the injected plastic. Additionally, the additional material may be a foaming agent which, if at the surface of a mold cavity, causes open cell surfaces on parts. At least in some applications, such as personal hygiene products, the presence of open cell surfaces can be susceptible to bacterial ingress and growth, resulting in the use of foaming agents for the surfaces of such products being banned by the FDA. Material and machine variances can also result in varying internal peak cavity pressures, which can cause inconsistencies in crosslinking and expansion of a material in the mold cavity further exacerbated by the effects of an incorrect location of an injected additional material. Additionally, inconsistencies in additive material location and density may cause expansion and crosslinking to occur at varying rates when the part is ejected from the mold and in a curing state where the molded parts continue to expand and crosslink until reaching a final form, thus resulting in inconsistently sized parts. Further, the parts may be deformed, have unsightly blemishes, and other undesirable flaws.

Inconsistencies in the location and density of additional materials can also cause structural and physical instabilities for parts. The size and density of cells in foaming agents depends on internal pressures, the location, and the density of the additional foam material in the mold cavity. Therefore, the cell structure of a molded part may be non-uniform, meaning free radical molecules may not be aligned. When these molecules are uniformly distributed, the resulting part has more consistent and stable dimensions and physical properties. For example, errors in the location and density of additional materials in the mold cavity may cause parts to be incorrectly dimensioned (i.e., parts may be either too large or too small) and may potentially be too soft or too resilient due to insufficient crosslinking or quantities of foam. As a result, the molded part may fail any number of objective test such as in abrasion test, a comprehension test, and/or dynamic elasticity test where energy loss is measured over a number of closely times impacts with a controlled load.

Further, conventional systems typically do not provide uniform heat distribution throughout the plastic during the molding process due to varying mold thicknesses. By unevenly heating the plastic, inconsistent regions of plastic and additional material within the mold cavity can expand at undesirable rates, which can result in inconsistent parts having wide tolerances.

SUMMARY

An additive injection device for an injection molding system of the present disclosure includes an additive injection unit with one or more additive tanks, each having a supply of an additive fluid. The additive fluid may be an expanding polymer or another additive material to be injected into a molten flow or mold cavity. One or more additive injectors in fluid communication with the one or more additive tanks receive the additive fluid and may inject the additive fluid material into an injection molding machine. One or more additive pumps may provide a pressure to the additive fluid in the tanks, manifold, and/or additive injectors and pump the additive fluid through additive injector nozzles. The additive fluid may be injected directly into a mold cavity, or upstream of a mold cavity such as in a manifold connecting each of the additive tanks with the additive injectors.

Typical injection molding systems that employ the addition of an additive material introduce the additive materials prior to injection of the molten resin into a manifold or mold cavity, which allows for variations in the location of the additive material in the mold cavity due to differences in molten resin flow and resin and mold cavity temperature among other factors. The injection of additive material directly into a mold cavity, or upstream of a mold cavity, near the mold cavity, may allow for more consistent fabrication of molded pieces across multiple fabrication sessions, and for better control over the location of additive materials or additive fluids in a mold cavity during a fabrication session.

An additive injection system of the present disclosure includes an additive injection device for use in an injection molding machine having an additive injection unit. A controller may control additive injectors and/or pumps of the additive injection unit to pump additive fluid in a pulsed or continuous manner. The additive fluid can also be pumped at low pressures for implementation in non-naturally balanced feed systems. Sensors, coupled to the controller, can provide feedback to the controller to allow for the controller to monitor variables such as flow temperature, cavity temperature, flow location, cavity pressure, and other factors during a fabrication session. The controller may also provide closer-loop control of the additive injection system during a fabrication session to allow for more accurate execution of an additive injection fabrication profile.

The systems and methods herein may provide better mixing of an additional material in a molten plastic material, provide better formation of cells or voids in an injection molded part, a better yield of a foaming agent, and a higher accuracy of the location of an additive fluid in a mold during an injection molding fabrication session therefore improving injection molding systems that employ the injection of additive fluids and materials.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals which:

DETAILED DESCRIPTION

Figure 1:
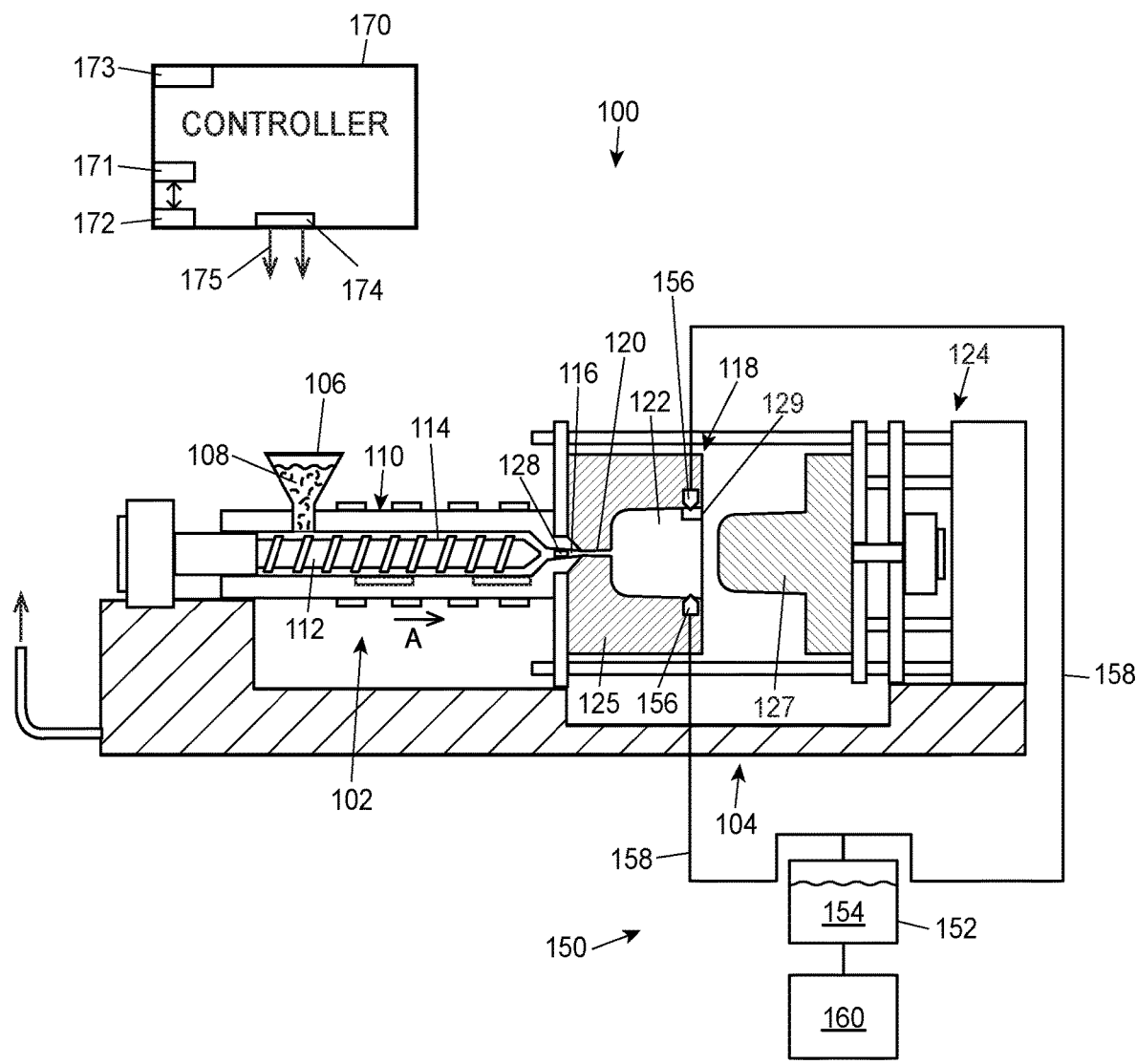
FIG. 1 illustrates a schematic view of an injection molding machine and an additive material injection device constructed according to the disclosure.

An injection molding process for the injection of additive materials into mold gating systems and cavities is herein described. FIG. 1 is a simplified drawing illustrating an exemplary injection molding machine 100 and an additive injection device 150. FIG. 1 is offered as an example of geometries in an injection molding machine and an additive injection device that may generate parts that have additive materials. It should be understood that any injection molding machine and additive injection device may be employed with the disclosed system, including simpler or more complex devices.

The injection molding machine 100 includes an injection unit 102 and a clamping system 104. The approaches described herein may be suitable for vertical press injection molding machines and any other known types of injection molding machines. The injection unit 102 includes a hopper 106 adapted to accept plastic or polymer injection materials in the form of pellets 108 or any other suitable form. In many examples, the pellets 108 include any number of thermoplastic materials including polyethylene, polypropylene, and nylon among others.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and compression of the pellets 108 by the reciprocating screw 112 causes the pellets 108 to melt, thereby forming a molten plastic material 114. The molten plastic material 114 is typically processed at a temperature selected within a range of about 110° C. and about 410° C.

The reciprocating screw 112 advances forward and forces the molten plastic material 114 toward a nozzle 116 to form a shot of plastic material 114 which will ultimately by injected into a mold cavity 122 of a mold 118 via one or more gates 120 which direct the flow of the molten plastic material 114 to the mold cavity 122. In other embodiments, the nozzle 116 may be separated from the one or more gates 120 by a feed system (not illustrated). The mold cavity 122 is formed between a first mold side 125 and a second mold side 127 of the mold 118 and the first and second mold sides 125 and 127 are held together under pressure via a press or clamping unit 124. The mold 118 may include any number of mold cavities 122 to increase overall production rates. The shapes and/or designs of the cavities may be identical, similar, and/or different from each other.

The press or clamping unit 124 applies a predetermined clamping force during the molding process which is greater than the force exerted by the injection pressure acting to separate the first and second mold sides 125 and 127, thereby holding together the first and second mold sides 125 and 127 while the molten plastic material 114 is injected into the mold cavity 122. To support the clamping forces, the clamping unit 124 may include a mold frame and a mold base, in addition to any other number of components.

The reciprocating screw 112 continues forward movement, causing the shot of molten plastic material 114 to be injected into the mold cavity 122. Once the shot of molten plastic material 114 is injected into the mold cavity 122, the reciprocating screw 112 stops traveling forward. The molten plastic material 114 takes the form of the cavity 122 and the molten plastic material 114 cools inside the mold 118 until the molten plastic material 114 solidifies. Once the plastic material 114 has solidified, the clamping unit 124 releases the first and second mold sides 125 and 127, the first and second mold sides 125 and 127 are separated from one another, and the finished part may be ejected from the mold 118.

Additive Injection System

The additive injection system 150 may also inject materials into the mold cavity 122. The additive injection system 150 includes a source of additive material that may be in the form of an additive tank 152 that contains a supply of an additive material 154 and additive injectors 156 each of which receives additive material 154 from the additive tank 152 and injects the additive material 154 into the mold cavity 122. The additive injectors 156 may be connected to the additive tank 152 by a common manifold 158, or additive feed channel, that provides a channel for the additive material 154 to travel from the additive tank 152 to the additive injectors 156. An additive pump 160 is connected to the additive tank 152 and/or the common manifold 158 and may pump the additive material 154 from the additive tank 152 and/or the common manifold 158 to the additive injectors 156.

The additive injection system 150 also includes a controller 170 that is communicatively coupled with the additive injection system 150 via one or more connections 175, and is generally used to control operation of the additive injection system 150. The one or more connections 175 may be any type of wired and/or wireless communications protocol adapted to transmit and/or receive electronic signals. In these examples, the controller 170 is in signal communication with at least one sensor, such as a sensor 128 located in the nozzle 116 and/or a sensor 129 located proximate to an additive injector 156. The sensor 129 may be located at any position within or near the mold cavity 122. In addition, the controller 170 may be in signal communication with one or more of the additive injectors 156. Feedback information from the additive injectors 156 may also be sent to the controller 170. It is understood that any number of additional sensors capable of sensing any number of characteristics of the mold 118 and/or the machine 100 may be placed at desired locations of the machine 100 and/or the additive injection device 150.

The controller 170 can be disposed in a number of positions with respect to the injection molding machine 100 and the additive injection device 150. As examples, the controller 170 can be integral with the additive injection device 150, contained in an enclosure that is mounted on the additive injection device 150, contained in a separate enclosure that is positioned adjacent or proximate to the additive injection device 150, or can be positioned remote from the additive injection device 150. In some embodiments, the controller 170 can partially or fully control functions of the additive injection device 150 via wired and/or wired signal communications as known and/or commonly used in the art.

The sensors 128 and 129 may be any type of sensor adapted to measure (either directly or indirectly) one or more characteristics of the molten plastic material 114. The sensors 128 and 129 may measure any characteristics of the molten plastic material 114 and/or additive material 154 that is known in the art, such as pressure or temperature, or any one or more of any number of additional characteristics which are indicative of these. The sensors 128 and 129 may or may not be in direct contact with the molten plastic material 114 and/or the additive material 154. In some examples, the sensors 128 and 129 may be adapted to measure any number of characteristics of the injection molding machine 100 and/or the additive injection system 150 and not just those characteristics pertaining to the molten plastic material 114 and/or the additive material 154.

The sensors 128 and 129 generate signals that are transmitted to an input 173 of the controller 170. If the sensor 128 is not located within the nozzle 116, the controller 170 can be set, configured, and/or programmed with logic, commands, and/or executable program instructions to provide appropriate correction factors to estimate or calculate values for the measured characteristic in the nozzle 116.

Similarly, the sensor 129 may be any type of sensor adapted to measure (either directly or indirectly) one or more characteristics of the molten plastic material 114 and/or the additive material 154 to detect its presence and/or condition in the mold cavity 122. In various embodiments, the sensor 129 may be located at or near an end-of-fill position in the mold cavity 122 or near an additive injector 156. The sensor 129 may measure any number of characteristics of the molten plastic material 114 and/or the additive material 154 in the mold cavity 122 that is known in the art, such as pressure or temperature, or any one or more of any number of additional characteristics which are indicative of these. The sensor 129 may or may not be in direct contact with the molten plastic material 114 and/or the additive material 154.

The sensor 129 generates a signal that is transmitted to the input 173 of the controller 170. If the sensor 129 is not located at the end-of-fill position in the mold cavity 122 or near an additive injector 156, the controller 170 can be set, configured, and/or programmed with logic, commands, and/ or executable program instructions to provide appropriate correction factors to estimate or calculate values for the measured characteristic at the end-of-fill position or near the additive injectors 156. It is understood that any number of additional sensors may be used to sense and/or measure operating parameters. For example, U.S. patent application Ser. No. 15/198,556, filed on Jun. 30, 2016 and published as U.S. Publication No. 2017/0001356, describes a sensor positioned prior to the end-of-fill to predict the end-of-fill and is hereby incorporated herein by reference in its entirety.

The controller 170 is also in signal communication with the additive pump 160. In some embodiments, the controller 170 generates a signal that is transmitted from an output 174 of the controller 170 to the additive pump 160. The controller 170 can control any number of characteristics of the additive injection device 150, such as injection pressures (by controlling the additive pump 160 and the additive injectors 156 at a rate which maintains a desired additive injection pressure of the additive material 154), additive injection speeds, inject forward time, injection pulse rates, and injection times among other characteristics.

The controller 170 may control the additive pump 160 and the additive injectors 156 to inject additive material 154 in a pulsed manner. In embodiments, the additive injectors 156 may be instructed by the controller 170 to inject additive material 154 into the cavity mold 122 at different pulse rates during a single injection cycle. For example, the additive injectors 156 may be instructed by the controller 170 to inject additive material 154 at a rate ranging from as few as 1,000 injections per minute during a first amount of time in an injection cycle, to as many as 100,000 injections per minute during a second amount of time in an injection cycle, the first and second amounts of times being part of an additive injection profile. The additive injection profile may include injection of additive material 154 from various additive injectors 156 simultaneously or independently, at various times during an injection mold cycle, and at various injection pulse rates among other characteristics.

In some embodiments, the controller 170 may control the additive pump 160 and the additive injectors 156 to inject additive material 154 at lower pressure (e.g., less than 6,000 psi) which may improve the dispersion of the additive material 154. Additionally, low pressure injection of additive materials may allow for the use of molds formed of easily machineable materials that are less costly and faster to manufacture than typical injection molds. In some embodiments, the additive pump 160 may pump the additive material 154 in a manner that provides a constant pressure to the additive injectors 156. A valve at an inlet of each of the additive injectors 156 may then be selectively openable to pressurize, and thereby pump, the additive material 154 through the associated additive injector 156. The controller 170 may control the additive pump 160 and the valves to pump additive material 154 according to an additive injection profile.

The signal or signals from the controller 170 may generally be used to control operation of the additive injection device 150 such that variations in material viscosity, activation temperatures, and other variations influencing the injection location and density of additive material 154 are taken into account by the controller 170. Adjustments may be made by the controller 170 in real time or in near-real time (that is, with a minimal delay between sensors 128 and 129 sensing values and changes being made to the process), or corrections can be made in subsequent cycles. Furthermore, several signals derived from any number of individual cycles may be used as a basis for making adjustments to the additive injection process or additive injection profile. The controller 170 may be connected to the sensors 128 and 129, the additive pump 160, the additive injectors 156, and/or any other components in the additive injection device 150 via any type of signal communication known in the art or hereafter developed.

The controller 170 includes software 171 adapted to control its operation, any number of hardware elements 172 (such as a memory module and/or processors), any number of inputs 173, any number of outputs 174, and any number of connections 175. The software 171 may be loaded directly onto a memory module of the controller 170 in the form of a non-transitory computer readable medium, or may alternatively be located remotely from the controller 170 and be in communication with the controller 170 via any number of controlling approaches. The software 171 includes logic, commands, and/or executable program instructions that may contain logic and/or commands for controlling the additive injection device 150 according to an additive injection profile for a mold cycle. The software 171 may or may not include one or more of an operating system, an operating environment, an application environment, or a user interface.

The hardware 172 uses the inputs 173 to receive signals, data, and information from the injection molding machine and the additive injection device 150 being controlled by the controller 170. The hardware 172 uses the outputs 174 to send signals, data, and/or other information to the additive injection device 150. The connection 175 represents a pathway through which signals, data, and information can be transmitted between the controller 170 and its additive injection device 150. In various embodiments this pathway may be a physical connection or a non-physical communication link that works analogous to a physical connection, direct or indirect, configured in any way described herein or known in the art. In various embodiments, the controller 170 can be configured in any additional or alternate way known in the art.

Use of Sensed Variables/Characteristics as Non-Time Dependent Variable as Trigger for Commencement of Additive Injection Profile As previously stated, during an injection molding cycle, the sensors 128 and 129, in addition to transmitting feedback from the additive injectors 156, provide signal data indicative of at least one variable related to operation of the additive injection device 150. During operation, the controller 170 commences an additive injection profile that may be stored in the software 171. In some examples, the additive injection profile may be commenced upon the measured variable reaching a threshold value. In these examples, the variable or characteristic may be one other than time (e.g., a cycle, step, or any other time), thus time may not be directly measured and used to determine the initiation or length of the additive injection profile, and accordingly, time is not directly measured and used to determine when the additive injection profile has completed. Rather, the variable or characteristic relies on another value or indicator as a determining factor for completion of the additive injection profile. The use of one or more non-time dependent variables is advantageous because, during successive runs, even with the same supply of pellets 108, variations in pellet quality, amount of additive material 154, catalyst stability, ambient conditions, or other factors may influence the accuracy of the location and density of additive material 154 in the mold cavity 122. While a time-dependent process may provide satisfactory parts most of the time, a system that determines the progress of the additive injection profile in an injection cycle based on one or more non-time dependent variables is preferable, as this provides a more accurate assessment of additive material readiness for each individual cycle of the molding system 100 and the additive injection device 150.

Figure 2A:
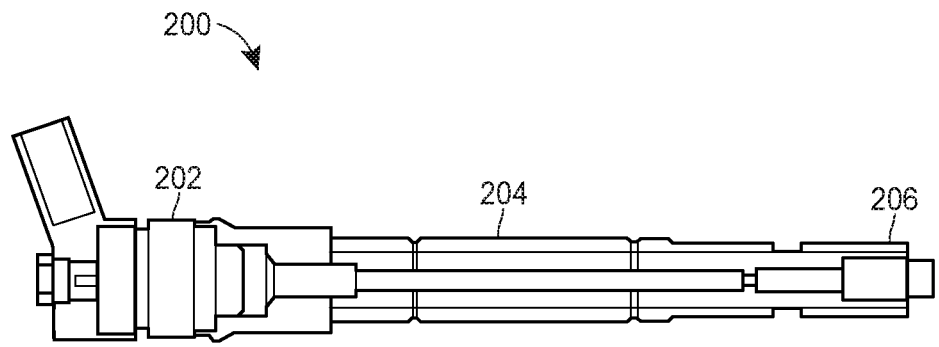
FIG. 2A illustrates a schematic view of an embodiment of an additive injector.

FIG. 2A is an embodiment of an additive injector 200 with an electromagnetic valve 202, an injector holder 204, and a nozzle 206. Additive material may pass through the electromagnetic valve 202, through the injector holder 204, into the nozzle 206, and out of the nozzle 206 into a mold cavity such as the mold cavity 122 of FIG. 1. The electromagnetic valve 202 may be electrically connected to a controller, such as the controller 170 of FIG. 1, and be controlled by the controller 170 in a manner that causes the electromagnetic valve 202 to open, to close, to partially open, to partially close, or to open and close in pulses at a given frequency or at various frequencies according to an additive injection profile.

Feedback information from the additive injector 200 may provide real-time information about the progress of the additive injection profile. One example of potential feedback information is the pressure of additive material inside of the injector holder 204. Monitoring of the pressure in the injector holder 204 may allow for the detection of the presence of molten plastic material at the location of the additive injector nozzle 206 in the mold cavity 122 that may provide information to the controller 170 causing the controller 170 to commence, end, modify, or advance an additive injection profile. The feedback information may also be used by a controller 170 to determine the amount of additive material or density of the additive material being injected into the mold cavity 122 over a period of time, which contributes to the temperature and pressure of the material inside of the mold cavity 122. Other factors may also be measured and used as feedback from the additive injector 200 to the controller 170 such as temperature of the additive injector 200, flow rate of additive material through the electromagnetic valve 202, through the injector holder 204, and/or through the nozzle 206 among other measurable factors.

Figure 2B:
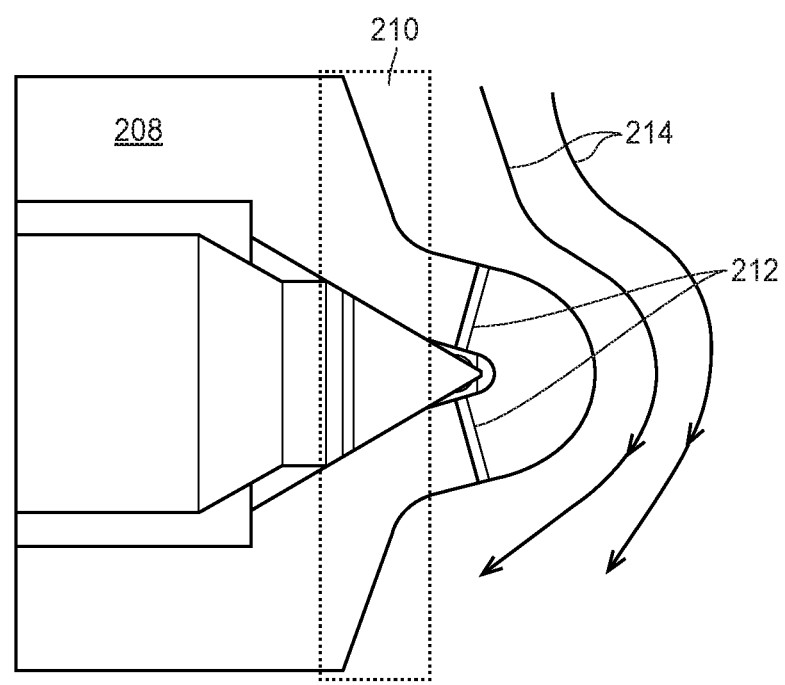
FIG. 2B is an enlarged view of an embodiment of a nozzle of an additive injector.

FIG. 2B is an enlarged view of the nozzle 206 on the additive injector 200 in FIG. 2A, disposed inside of a wall of a mold 208. The mold 208 has an injector seat 210 and one or more orifices 212. The orifices 212 provide a channel for additive fluid to be injected by the additive injector 200 directly into a mold cavity. The additive injector 200 may inject the additive material into the mold cavity while the cavity is substantially filled (i.e., greater than 90%) to introduce additive material at a time near the end of an injection cycle, which may be useful for introducing additive materials onto surfaces of a molded part. In some embodiments, the additive injector 200 may be disposed upstream of a mold cavity in a gate that directs the flow of molten plastic material 214 into the cavity. Injection of additive materials upstream of a mold cavity, as close to the mold cavity as possible, may provide more accurate final positioning of the additive material in a mold cavity, and allow for more consistent part fabrication across multiple fabrication sessions. In embodiments with an expanding crosslinking polymer as the additive material, injection of additive materials close to the mold cavity may allow for better control of the chemical reactions occurring in the expanding crosslinking polymers. In some embodiments, the additive injector 200 may be implemented in naturally or non-naturally balanced feed systems. Artificially (or non-naturally) balanced feed systems are described in US 2012/0292823 "NON-NATURALLY BALANCED FEED SYSTEM FOR AN INJECTION MOLDING APPARATUS", the entirety of which is hereby incorporated by reference.

Additive injectors 200 in gates may inject additive material into a flow of molten plastic material 214. In some embodiments, the orifice 212 may guide injected additional material into the gate in an upstream manner, i.e., against the direction of the flow of molten plastic material 214. Injecting additional material into molten plastic material 214 in an upstream manner may induce additional shear providing better mixing of an additional material in the molten plastic material 214. Alternatively, in other embodiments, the orifice 212 may guide injected additional material into the gate in a downstream manner, i.e., the same direction as the flow of molten plastic material 214 providing better formation of cells or voids in an injection molded part and potentially a better yield of a foaming agent. In embodiments, such as the embodiment of the additive injector 200 of FIG. 2B, there may be multiple orifices 212 that guide additional material into the flow of molten plastic material 214 at multiple locations and with multiple angles relative to the direction of the flow of molten plastic material 214. In other embodiments, the orifice may guide injected addition material into the gate perpendicularly to the flow of molten plastic material 214, or any combination of orifices 212 that may inject additional material into the flow of molten plastic material 214 at various angles relative to the flow of molten plastic material 214. In embodiments, the nozzles of additive injectors and orifices of molds may be strategically placed near or at a pinch-off points to reduce potential part defects.

Some additive materials may not require further mixing or dispersion into a molten flow other than mixing and dispersion due to injection by additive injectors as described herein. Depending on the material properties or the additive material, some additive materials may require further mixing or dispersion into a molten flow. In such embodiments that require further mixing of the additive material, a mixer element may assist with mixing of the additive material into the molten flow. The mixer element may be disposed in a gate or manifold upstream or downstream of the additive injector to induce movement in the polymer molten flow to mix the additive material into the polymer in a more homogeneous dispersion throughout the polymer molten flow. Additionally, the mixing element may be disposed anywhere in an injection molding system where the molten polymer flows. The mixing element may be a single protrusion from a side wall of the gate, a grid pattern which the molten polymer flows through, a rotating structure such as a rotating blade or multiple fan blades, or any other structure that enables the mixing of the additive material into the molten polymer.

In some embodiments, the additive material may be a foaming agent, crosslinking agent, or the like. A class of polymers commonly used as a foaming agent in injection molding are expanding crosslinking polymers. Expanding crosslinking polymers have an activation temperature at which expansion and crosslinking within the polymer begins to occur. Examples of expanding crosslinking polymer is ethylene-vinyl acetate or "EVA", which, when polymerized, include any number of blowing agents and any number of crosslinking agents with are activated by a specified activation temperature. For example, the blowing agents and crosslinking agents may be activated at temperatures between approximately 160° C. and approximately 190° C., or preferably, at temperatures between approximately 165° C. and approximately 185° C., and more preferably, at temperatures between approximately 170° C. and approximately 180° C., which may provide an optimal range for blowing and crosslinking to occur. Other examples of suitable temperature ranges are possible.

Referring now back to FIG. 1, in embodiments that employ expanding crosslinking polymers as the additive material, the additional material 154 may be injected into the mold cavity 122 while the mold cavity 122 is at a temperature below the activation temperature, for example between 110° C. and 150° C. As the mold cavity 122 continues to fill with molten plastic material 114 and additional material 154, the mold cavity 122 is heated to a temperature that is higher than the activation temperature of the additional material 154. For example, the mold cavity 122 may be heated to a temperature between approximately 160° C. and approximately 185° C., and preferably, to a temperature between approximately 170° C. and 180° C. As such, a chemical reaction begins to occur within the additional material 154. It is understood that walls of the mold cavity 122 may be preheated prior to injection the molten plastic material 114 and/or the additional material 154, or alternatively, may be rapidly heated to a suitable temperature as the molten plastic material 114 and/or the additional material 154 enters the mold cavity 122. Examples of heating techniques that may be used to heat surfaces of the mold that define the mold cavity are: resistive heating (or joule heating), conduction, convection, use of heated fluids (e.g., superheated steam or oil in a manifold or jacket, also heat exchangers), radiative heating (such as through the use of infrared radiation from filaments or other emitters), RF heating (or dielectric heating), electromagnetic inductive heating (also referred to herein as induction heating), use of thermoelectric effect (also called the Peltier-Seebeck effect), vibratory heating, acoustic heating, and the use of heat pumps, heat pipes, cartridge heaters, or electrical resistance wires, whether or not their use is considered within the scope of any of the above-listed types of heating.

Figure 3A:
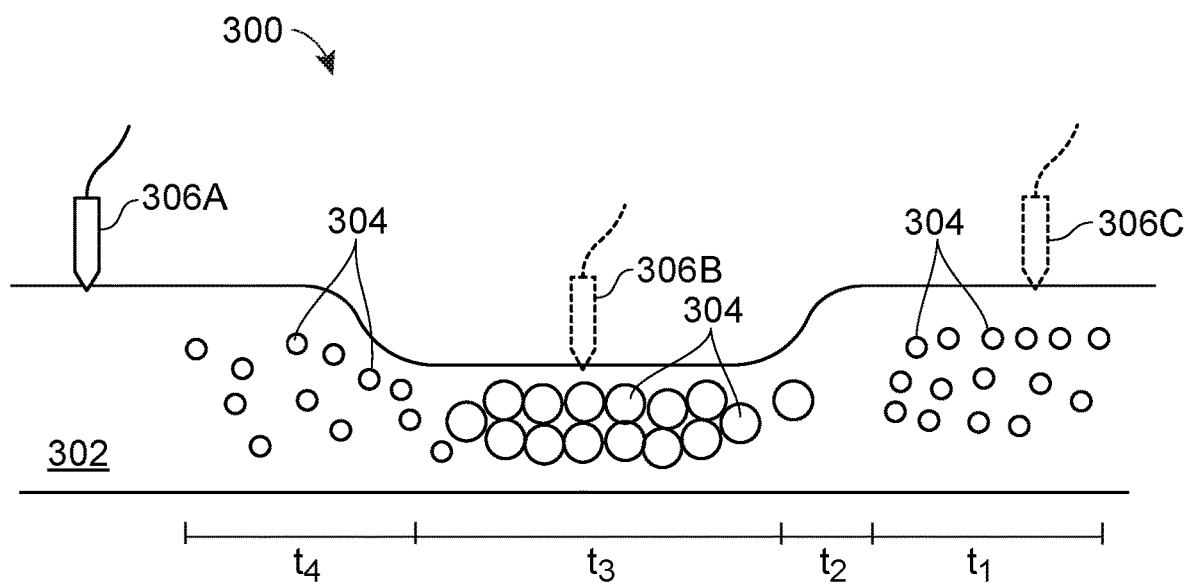
FIG. 3A is a side cross sectional view of a portion of a mold cavity at a stage of being filled by the molding machine of FIG. 1 and an additive injection device.
Figure 3B:
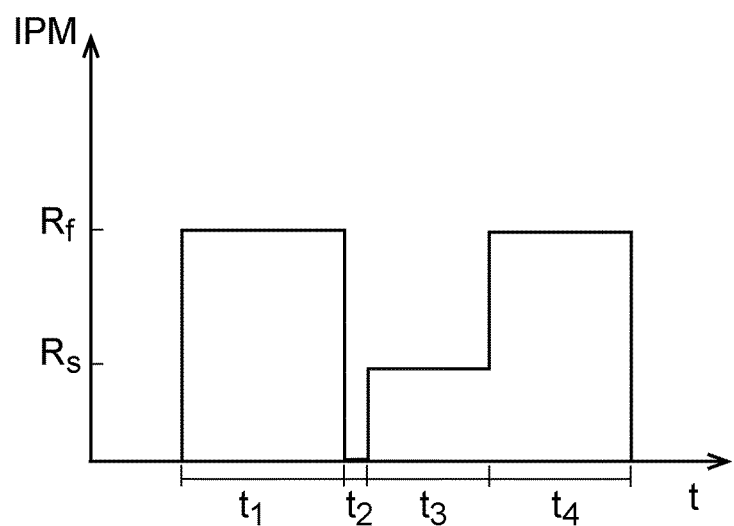
FIG. 3B is a potential injections per minute injection profile curve to be performed by the additive injection device of FIG. 1 to achieve the additive cell structures in FIG. 3A.

Foaming agents may be used to reduce the weight or density of a final product or to introduce break points in a part. For example, FIG. 3A is an illustration of a molded part 300 in a mold cavity filled with molten plastic material 302 and additive material creating additive material cells 304. In embodiments, a single additive injector 306A may inject additive material into the molten plastic material 302. In FIG. 3A the additive material may be a foaming agent, fluid, or a gas creating additive material cells 304. The additive injector 306A may be controlled by a controller, such as the controller 170 of FIG. 1, to inject additive material according to an additive injection profile. FIG. 3B illustrates one example of an additive injection profile that may be implemented to generate additive material cells 304 of different sizes and densities, such as the cells 304 illustrated in FIG. 3A. Referring now simultaneously to FIGS. 3A and 3B, the additive injector 306A may inject additive material into the molten plastic material 302 at a slow repetition rate, $R_s$, during a first time period, $t_1$, of an injection mold production cycle generating additive material cells 304. The additive injector 306A may stop injecting additive material into the molten plastic material 302 for a second period of time, $t_2$, to create a solid plastic region in the part being molded. The additive injector 306A may inject additive material into the molten plastic material 302 at a faster repetition rate, $R_f$, for a third time period, $t_3$, resulting in larger, higher density additive material cells 304. In addition to changing the pulse rate, the open-to-close duty cycle of the nozzle of the additive injector 306A may be increased or decreased to generate larger or smaller additive material cells 304 accordingly. Higher density, larger cells, such as those injected during the time $t_3$, may be generated by increasing the repetition rate of injections as well as increasing the open-to-close duty cycle of the nozzle. Further, the additive injector 306A may reduce the injection repetition rate back to the slower rate $R_s$ for a time period $t_4$ resulting in smaller, less dense additional material cells 304 in a corresponding region of the molded part 300. As illustrated in FIG. 3 the molded part 300 then has a region of large, high density additional material cells which may result in a region where the part is structurally weaker than other regions. The weakness introduced by the large higher density additional material cells 304 may allow for the part to have a break point in the region containing the large, higher density additional material cells 304 intended to be broken off, such as a plastic tab or a twist off breakable tab for a plastic drink container.

In some embodiments, multiple additive injectors 306A, 306B, and 306C may be implemented to achieve the three regions of additive injection cells illustrated in FIG. 3A. The additive injectors 306A, 306B, and 306C inject additive material into a molten material 302 at respective fast and slow rates to achieve the desired size and density of additional material cells in each of the additive injector's 306A, 306B, and 306C corresponding regions of the mold cavity. Each of the additive injectors is independently controlled by a controller, such as the controller 170 of FIG. 1, to inject additive material according to additive injection profiles that depend on the location, density, and size of desired additive material cells 304 in each additive injector's 306A, 306B, and 306C corresponding regions of the mold cavity. The example illustrated in FIGS. 3A and 3B illustrates that a single additive injector 306A may be used to generate varied cell sizes and densities in a molded part implementing a dynamic additive injection profile, and that more additive injectors 306B and 306C may be used to generate the same part using multiple independent generally static additive injection profiles. Although FIG. 3A illustrates three additive injectors 306A, 306B, and 306C, any number of additive injectors may be used to inject additive material into a mold cavity. Additionally, any number of dynamic injection profiles, static injection profiles, or combination thereof, may be implemented to achieve the desired location, concentration, and amount of additional material and/or size of additional material cells in a mold cavity.

In some embodiments, the additive material may be a non-foaming material. Additive material cells, such as the cells 304 of FIG. 3A may be created by injection a non-foaming material into a mold cavity in a pulsed manner. The cell sizes and locations can be controlled with high precision by injecting the additive material directly into a gate or directly into the mold cavity, instead of injecting the additive material further upstream. In some embodiments, air or another light-weight fluid may be implemented as the additive material which may allow for the generation of lighter, less heavy, parts, for reducing the cost of generating a part, and/or reducing the amount of molten plastic material required for a part.

In other embodiments, the additive material may be a colorant. It may be desirable to inject colorants into a flow of molten plastic material to create a colored core for a molded part, or a colored surface of a part. The amount of colorant and location of the colorant may be precisely controlled by injecting a colorant into the gate or directly into the mold cavity of an injection molding machine, which may allow for higher resolution physical features and color designs in a part and on the surface of a molded part. In addition, the additive injectors and methods described herein provide more control over the density of an injected colorant which may allow for a wider range or gradient of colors for parts, and/or reduce color defects and inconsistencies of molded parts.

In embodiments the additive material may be a catalyst or a surfactant for controlling the surface tension of an injected plastic or molten material. In embodiments the additive material may be a thermoplastic material such as ABS, polypropylene, polyoxmethylene, polycarbonate, PVC, nylon, acrylic, styrene, polyether imide, or blends of the aforementioned material. In embodiments the additive material may be a supercritical fluid which may be used for localized dyeing, dissolving of a polymer, and potentially for accelerating the diffusion of a polymer. In yet other embodiments the additive material may be a powder introduced with solution assist. For example, in a metal injection molding system the additive material may be a metal powder to fabricate a part molded as a mix of between 70 to 80% of the atomized metal powder and 30 to 20% of a polymer wax.

The location and amount of the additive material 154 injected into the mold cavity 122 can be finely controlled, reducing the number of defects in molded parts. In addition, the methods and devices described herein enable high pressure, high speed material atomization during an injection mold cycle leading to possibilities for direct polymerization processes. The method and devices described herein enable increased control of device properties creating ranges for a parts weight, cost, durability, and color among other properties.

Figure 4:
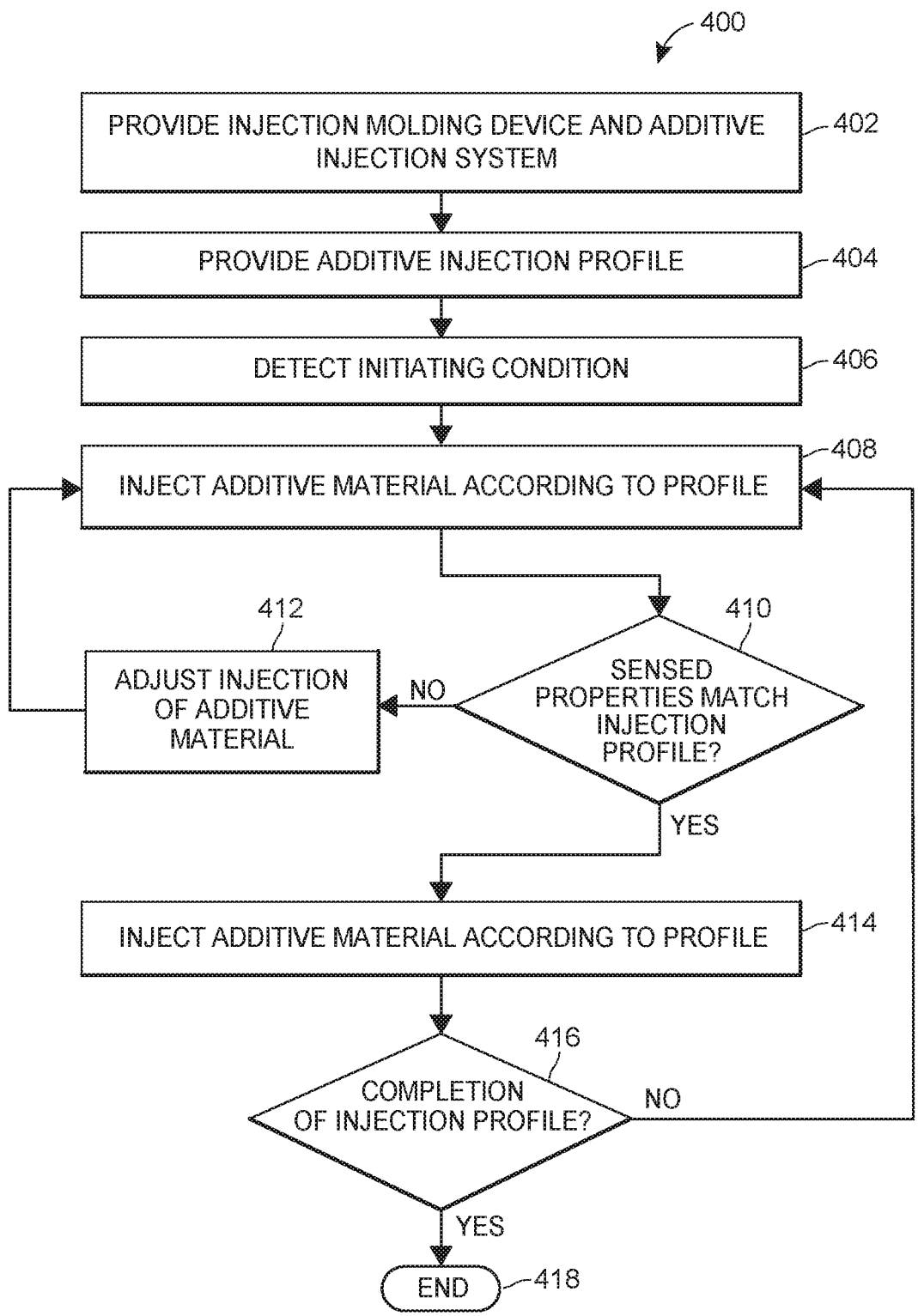
FIG. 4 is a flowchart illustrating an embodiment of a process for injection additive material into a mold cavity during an injection molding cycle.

FIG. 4 is a flowchart illustrating an embodiment of a method 400 for injecting additive material into an injection molding machine, such as the machine 100 in FIG. 1, downstream of the nozzle 116 of the injection molding machine 100. At a block 402, a physical injection molding machine (such as the injection molding machine 100 of FIG. 1) and a physical additive injection device (such as the additive injection device 150 of FIG. 1) are provided. A controller controls the additive injection device and receives information from sensors and/or additive injectors. At 404, an additive injection profile including pressure, volume, and temperature curves and/or other information is provided to a controller for a desired injection rate or pulsed injection pattern of additive material.

At 406, an initiating condition, which may be included in the additive injection profile, may be detected causing, at 408, the initiation of injecting additive material according to the additive injection profile. The initiating condition may be a limit or initiating value such as an initiating temperature value, initiating pressure value, detected location of injected molten material in a gate or mold cavity, a detected flow rate of molten material, or any other measurable factor or value. In some embodiments the initiating condition may be time dependent such as a time delay after the initiation of an injection molding cycle. At 410, sensors may sense or monitor the pressure, volume, temperature or other property of the additive material, additive injectors, molten material, or other parts of the injection molding machine and/or additive injection system. If, during an additive injection during an injection molding cycle, the sensed pressure, volume, temperature, and/or other properties do not match the corresponding curves or desired values in the additive injection profile, the injection of the additive material may be adjusted (at 412).

In some embodiments, the controller controlling the additive injection system may send a signal to another controller controlling the injection molding machine to alter the injection of molten material to assist with achieving injection of additive material according to the additive injection profile. In other embodiments, the controller controlling the additive injection system may also control, or communicate directly with the injection molding machine allowing a single controller to make adjustments to the injection of both the molten plastic material, and the additive injection material. The controller may also be connected to other devices or send signals to other devices to make corrections or alterations to the pressure, temperature, volume, or other characteristics of the molten material, additive injection material, injection molding machine, and/or the additive injection system (e.g., controlling active heating of the mold cavity through means of heating lines, resistive heating elements, or other devices).

If during an additive injection cycle, the measured conditions or properties match the additive injection profile, additive material injection continues (at 414) and the additive injection is monitored to see if the additive injection profile has been completed (at 416). If the additive injection profile has not been completed, the additive injection continues (at 408), and may be further monitored by the sensors and controller (at 410) to ensure the additive injection is performed according to the additive injection profile. If it is determined that the additive injection profile has completed (at 416) the additive injection ends (at 418).

The device and method of implementing additive injectors to inject additional material into an ejection molding system may be used in an injection molding process, which is the primary process discussed herein. However, the method of injection additive material may alternately be used in other molding processes, such as a substantially constant pressure injection molding process, an injection-blow molding process, a blow molding process, a metal injection molding (MIM) process, a reaction injection molding (RIM) process, a liquid injection molding (LIM) process, a structural foam molding process, a liquid crystal polymer (LCP) molding process, and an injection-stretch blow molding process.

In some embodiments, a controller, such as the controller 170 of FIG. 1, may interface with or control the injection molding machine 100 in addition to controlling the additive injection device 150. The controller 170 may control the injection of the molten plastic material 114 and the additive material 154, and may monitor any properties including the pressure, volume, temperature, flow rate, or any other characteristic of the molten plastic material 114, additive material 154, the injection molding machine 100 and/or the additive injection device 150. Controlling both the injection of the injection molding machine 100 and the additive injection device 150 with the same controller may allow for more accurate control of the injection of additive materials during an injection molding cycle due to the ability to monitor and control the characteristics and injection of the plastic molten material.

Figure 5:
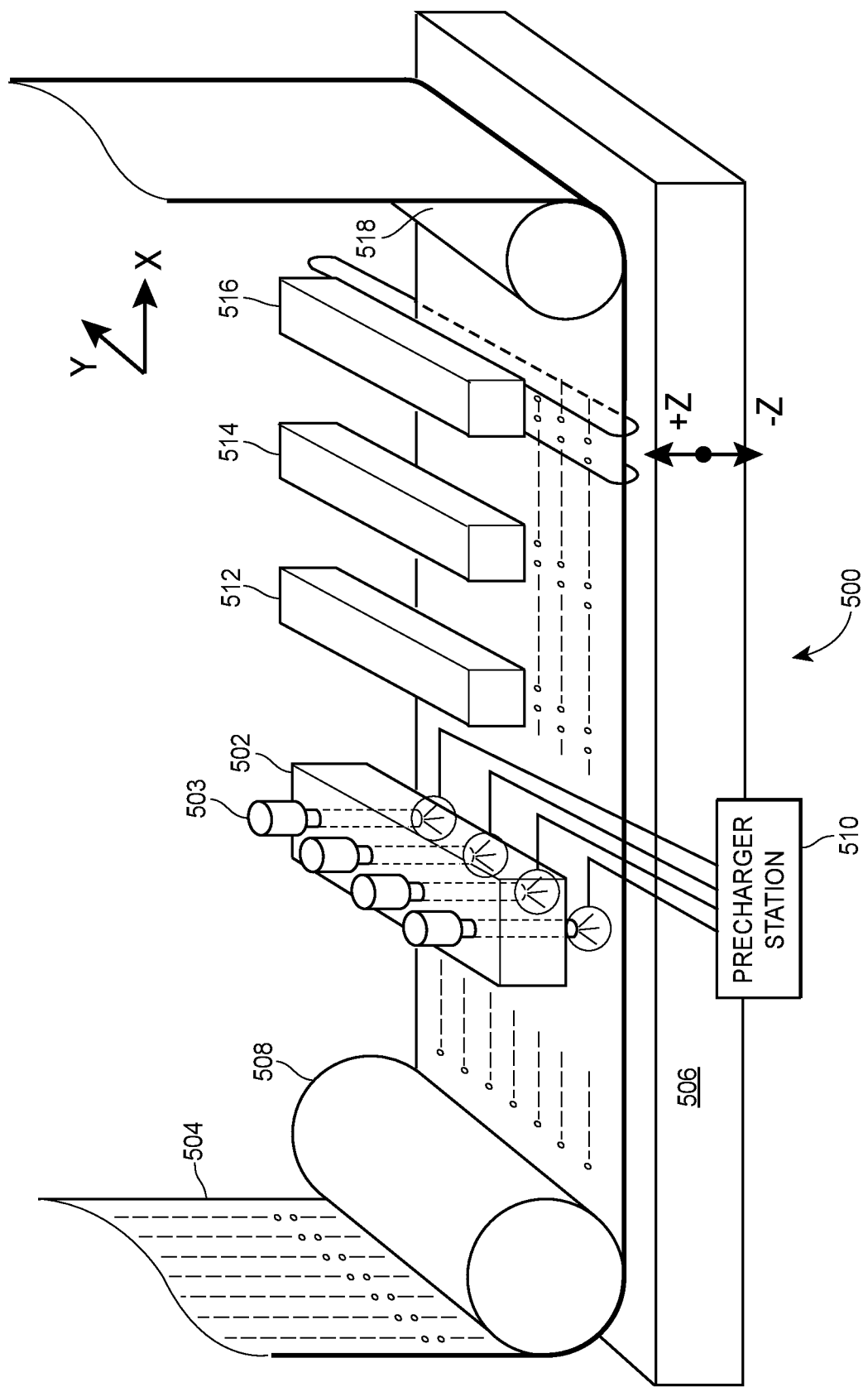
FIG. 5 is an illustration of a system that integrates an apparatus for producing high resolution printing of polymer or metal parts and structures.

The device and method of implementing additive injectors to inject additional material into an ejection molding system may be used in micro-molding, 3D printing processes, wire electrical discharge machining (EDM), additive manufacturing processes, material deposition, and similar technologies. FIG. 5 is an illustration of a system 500 that integrates an apparatus for producing, processing, depositing, and fusing polymer droplets, flakes, and/or particles onto a part to achieve high resolution printing of polymer or metal parts and structures. An additive injection device 502 with additive injectors 503 may inject additive materials onto a photoreceptive tape 504 to assist in ink and laser printing onto a polymer structure or part 504. A recharging drum 508 may apply an AC or DC bias to the photoreceptive tape 506 to remove any residual charges on the photoreceptive tape 504 and to ensure a uniform negative potential on the photoreceptive tape 506. The additive injection device 502 may have one or more additive injectors 503 that deposit additive material onto the photoreceptive tape 504 at rates up to 100,000 injections per minute to generate high resolution depositions of the additive material. A precharge station 510 may provide a positive charge or remove areas of negative charge on the photoreceptive tape 504. A charging station 512 may further provide positive charge or remove negative charge from the photoreceptive tape 504. A solutions assist deposition station 514 may deposit negatively charged particles or material onto the photoreceptive tape 504. The negatively charged particles or material only adhere to the photoreceptive tape 504 at locations where the negative charge has been removed from the photoreceptive tape 504 due to the fact that negatively charged particles repel each other. A fusion station 516 may then heat the materials on the photoreceptive tape 504 causing the materials to fuse to a part 506 at the corresponding locations of the materials on the photoreceptive tape 504. A cooling drum 518 may provide thermal cooling to the photoreceptive tape to allow for the tape to be recharged, and reused for another iteration of the described deposition process. The system 500 may be implemented in high temperature (1200° C.) fusion processes to achieve molding and deposition capabilities for metals. While the description of the system 500 herein pertains to deposition of materials onto a part 506 in a fusion system, similar implementations of a system 500 with an additive injection device 502 may be implemented for ink and laser printing systems, wire electrical discharge machining, and fusion systems in electron microscopy.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. An injection molding apparatus, comprising:
   a mold including a plurality of mold cavities formed by a first mold side and a second mold side;
   an injection unit including a hopper, a barrel, and a reciprocating screw configured to advance molten material toward a nozzle which injects the molten material into the mold cavities via one or more gates in fluid communication with the mold cavities;
   an additive injection molding system including:
      one or more additive tanks, each having a supply of an additive fluid material that is different than the molten material;
      one or more additive injectors in fluid communication with the one or more additive tanks, each of the additive injectors configured to receive and inject the additive fluid material into each of the mold cavities, each of the one or more additive injectors being distinct from the nozzle and being positioned in a respective one of the mold cavities;
      a common manifold connecting each of the one or more additive tanks and the one or more additive injectors; and
      one or more additive pumps that pump the additive fluid through the one or more additive injectors;
   a controller configured to control operation of the mold, the injection unit and the additive injection molding system; and
   one or more sensors coupled to the additive injection molding system and in communication with the controller, wherein at least one of the one or more sensors is configured to measure at least one non-time dependent variable during an injection mold cycle.

2. The injection molding apparatus of claim 1, at least one of the one or more additive injectors has an outlet nozzle configured to inject additive fluid in a downstream manner, in a direction away from an inlet end, and toward an end opposite the inlet end, of a respective one of the plurality of mold cavities.

3. The injection molding apparatus of claim 2, further comprising, in at least one of the mold cavities, a mixing element provided to mix additive material injected by the one or more additive injectors into molten material.

4. The injection molding apparatus of claim 3, the mixing element being disposed between the inlet end of the mold cavity and the respective outlet nozzle.

5. The injection molding apparatus of claim 3, the respective outlet nozzle being disposed between the mixing element and the inlet end of the mold cavity.

6. The injection molding apparatus of claim 1, at least one of the one or more additive injectors has an outlet nozzle configured to inject additive fluid in an upstream manner, in a direction toward an inlet end, and away from an end opposite the inlet end, of a respective one of the plurality of mold cavities.

7. The injection molding apparatus of claim 6, further comprising, in at least one of the mold cavities, a mixing element provided to mix additive material injected by the one or more additive injectors into molten material.

8. The injection molding apparatus of claim 7, the mixing element being disposed between the inlet end of the mold cavity and the respective outlet nozzle.

9. The injection molding apparatus of claim 7, the respective outlet nozzle being disposed between the mixing element and the inlet end of the mold cavity.

10. The injection molding apparatus of claim 1, wherein the one or more additive injectors injects additive fluid of pressures of 6,000 psi or less.

11. The injection molding apparatus of claim 1, wherein the additive fluid comprises an expanding crosslinking polymer, a non-expanding polymer, a colorant, a gas, a liquid, a supercritical fluid, a powder, a surfactant, a catalyst, an emulsifier, or any combination thereof.

12. The injection molding apparatus of claim 1, wherein the one or more additive tanks comprise a plurality of additive tanks, at least one of the plurality of tanks including a supply of a different additive fluid than the additive fluid of another of the plurality of tanks.

13. The injection molding apparatus of claim 1, the at least one non-time dependent variable indicative of a condition warranting one of a group including commencing introduction of the additive fluid material, terminating introduction of the additive fluid material, and modifying introduction of the additive fluid material.

14. The injection molding apparatus of claim 1, wherein the one or more additive injectors provide feedback information to the controller.

15. The injection molding apparatus of claim 1, wherein the controller provides open-loop control of the additive injection molding system.

16. The injection molding apparatus of claim 1, wherein the controller provides closed-loop control of the additive injection molding system with feedback information from at least one of a measurement from the one or more sensors and feedback information from the one or more additive injectors.

17. The injection molding apparatus of claim 1, wherein the controller is configured to control the additive injectors to inject the respective additive fluid material in a pulsed manner.

* * * * *